United States Patent
Lin et al.

(10) Patent No.: US 11,470,532 B2
(45) Date of Patent: Oct. 11, 2022

(54) USER EQUIPMENT, COMMUNICATION SYSTEM, AND HANDLING METHOD FOR HANDOVER FAILURE

(71) Applicant: Industrial Technology Research Institute, Hsinchu (TW)

(72) Inventors: Jung-Mao Lin, Hsinchu County (TW); Nai-Lun Huang, Taoyuan (TW); Wan-Jung Tsai, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/984,003

(22) Filed: Aug. 3, 2020

(65) Prior Publication Data
US 2021/0051556 A1    Feb. 18, 2021

Related U.S. Application Data

(60) Provisional application No. 62/887,680, filed on Aug. 16, 2019.

(51) Int. Cl.
*H04W 36/30* (2009.01)
*H04W 76/19* (2018.01)
*H04W 76/11* (2018.01)
*H04W 36/08* (2009.01)
*H04W 36/00* (2009.01)

(52) U.S. Cl.
CPC ..... *H04W 36/305* (2018.08); *H04W 36/0079* (2018.08); *H04W 36/08* (2013.01); *H04W 76/11* (2018.02); *H04W 76/19* (2018.02)

(58) Field of Classification Search
None
See application file for complete search history.

(56) References Cited

U.S. PATENT DOCUMENTS

| 9,544,828 B2 | 1/2017 | Kitazoe |
| 10,499,301 B2 | 12/2019 | Moon et al. |
| 10,517,133 B2 | 12/2019 | Teyeb et al. |
| 10,530,639 B2 | 1/2020 | Dudda et al. |

(Continued)

FOREIGN PATENT DOCUMENTS

| TW | I526094 | 3/2016 |
| WO | 2008114183 | 9/2008 |

(Continued)

OTHER PUBLICATIONS

3GPP, "Handling of Conditional Handover Failure in NR", 3GPP TSG-RAN WG2 Meeting #105bis, Apr. 8-12, 2019, pp. 1-4.

(Continued)

*Primary Examiner* — Mohammad S Adhami
(74) *Attorney, Agent, or Firm* — JCIPRNET (57) ABSTRACT

A user equipment (UE), a communication system, and a handling method for handover failure are provided. The handover procedure of the UE from a source cell to one or more configured target cells fail. In the method, in response to the handover procedure failing, a cell selection procedure to select a suitable cell is performed, where the cell selection procedure is configured to perform a connection re-establishment procedure. Whether to continue the connection re-establishment procedure is determined according to a determining result of whether a suitable cell is one configured target cell.

18 Claims, 11 Drawing Sheets

(56) References Cited

U.S. PATENT DOCUMENTS

| 10,674,559 | B2 | 6/2020 | Wager et al. |
| 2015/0109946 | A1 | 4/2015 | Sharma et al. |
| 2017/0013532 | A1* | 1/2017 | Olofsson ............... H04W 36/38 |
| 2018/0270812 | A1* | 9/2018 | Lee ..................... H04W 72/042 |
| 2019/0223073 | A1* | 7/2019 | Chen ................. H04W 36/0079 |
| 2019/0335494 | A1 | 10/2019 | Namba |
| 2020/0281031 | A1* | 9/2020 | Wang .................... H04W 76/10 |
| 2021/0258111 | A1* | 8/2021 | Xu ...................... H04L 47/2483 |

FOREIGN PATENT DOCUMENTS

| WO | 2009076208 | 6/2009 |
| WO | 2010078208 | 7/2010 |

OTHER PUBLICATIONS

3GPP, "Conditional handover failures in NR", 3GPP TSG RAN WG2 #105bis, Apr. 8-12, 2019, pp. 1-5.
3GPP, "Failure handling on CHO", 3GPP TSG RAN WG2 Meeting #106, May 13-17, 2019, pp. 1-3.
3GPP, "Using a timer for checking conditional handover failure in NR", 3GPP TSG-RAN WG2 Meeting #106, May 13-17, 2019, pp. 1-2.
3GPP, "Considerations on failure handling for CHO", 3GPP TSG-RAN WG2 Meeting #106, May 13-17, 2019, pp. 1-2.
3GPP, "Discussion on the RLF and HOF for CHO", 3GPP TSG-RAN WG2 Meeting #106, May 13-17, 2019, pp. 1-4.
"Office Action of Taiwan Counterpart Application", dated Feb. 22, 2021, p. 1-p. 10.

* cited by examiner

FIG. 13

USER EQUIPMENT, COMMUNICATION SYSTEM, AND HANDLING METHOD FOR HANDOVER FAILURE

CROSS-REFERENCE TO RELATED APPLICATION

This application claims the priority benefits of U.S. provisional application Ser. No. 62/887,680, filed on Aug. 16, 2019. The entirety of the above-mentioned patent application is hereby incorporated by reference herein and made a part of this specification.

TECHNICAL FIELD

The disclosure relates to a handover handling mechanism, and in particular, to a user equipment, a communication system, and a handling method for handover failure.

BACKGROUND

Figure 1:
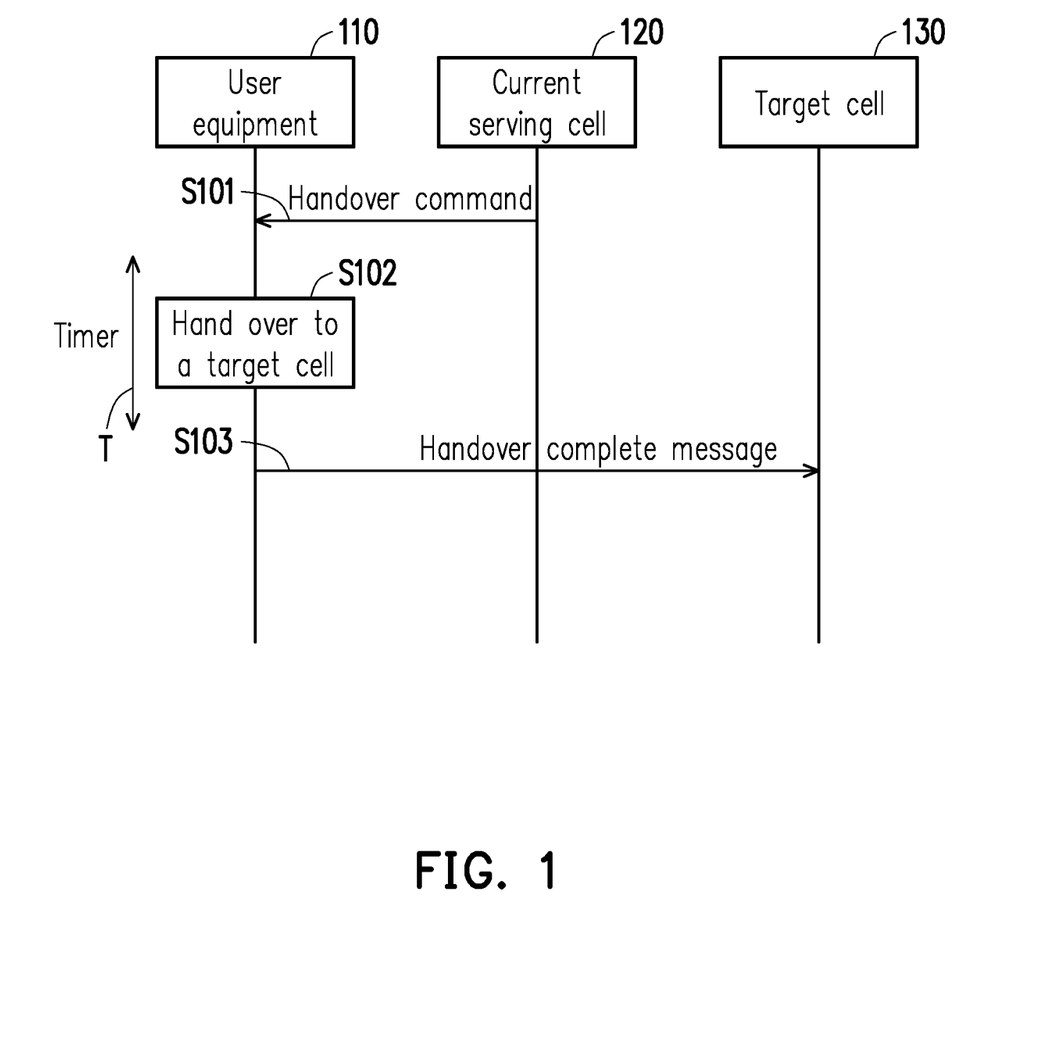
FIG. 1 is a flowchart of a conventional handover procedure.

A handover failure procedure is used to detect a handover problem in which a user equipment (UE) cannot complete the handover procedure, which may be detected by a timer. FIG. 1 is a flowchart of a conventional handover procedure. Referring to FIG. 1, after user equipment 110 receives a handover command from a current serving cell 120 (step S101), a timer T would start. If the user equipment 110 successfully switches to the target cell 130 (step S102), the user equipment 110 transmits a handover complete message (step S103) to announce the completion of the handover procedure, and the timer T would stop. However, when the timer T expires, if the user equipment 110 has not successfully sent the handover complete message, it indicates that handover failure occurs. Once the handover failure occurs, the user equipment 110 would trigger a connection re-establishment procedure to re-establish a radio resource control (RRC) connection.

It should be noted that before the connection re-establishment procedure is to be performed, in the existing mechanism, it is assumed that only a source cell 120 retains context data of the user equipment 110, and therefore the user equipment 110 needs to revert to the configuration of a radio bearer (RB) originally used by the source cell 120 (i.e., source cell configuration), so that a selected cell in the subsequent connection re-establishment procedure may identify an identity of the user equipment 110 through the source cell 120. Even though the target cell 130 may obtain the context data of the user equipment 110 in a handover preparation stage, if the selected cell is still the target cell 130, the target cell 130 still needs to identify the identity of the user equipment 110 through the source cell 120. Obviously, these situations cause unnecessary delays.

It should be further noted that in the application scenario of the fifth-generation (5G) New Radio (NR), there is a high possibility that the user equipment 110 is still located within the service coverage of the target cell 130 after the handover failure. That is, the cell selected by the user device 110 is still the target cell 130. Scenario I is that the moving trajectory of the user equipment 110 or the cell is predictable: for example, the user equipment 110 is on a high-speed train or the user equipment 110 is in a non-terrestrial network scenario. Scenario II is the handover failure caused by the failure of Listen-Before-Talk (LBT): for example, in case of the failure of Listen-Before-Talk in New Radio in unlicensed spectrum (NR-U) access, and the user equipment 110 continues to be located within the service coverage of the target cell 130 after the handover failure. Scenario III is to configure multiple target cells 130 in the handover procedure. For example, during conditional handover (CHO), the user equipment 110 may configure more than one target cell 130, and even if handover fails, there is still a high possibility that the user equipment 110 remains within the service coverage of other configured target cells 130. It may be learned that it is necessary to provide an improved mechanism to avoid program delay.

SUMMARY

Embodiments of the disclosure provide user equipment (UE), a communication system, and a handling method for handover failure.

The handling method for handover failure of the embodiment of the disclosure is applicable to a case that a handover procedure of the UE from a source cell to one or more configured target cells fails. The handling method includes (but is not limited to) the following steps. In response to the handover procedure failing, a cell selection procedure is performed to select a suitable cell is performed, where the cell selection procedure is configured to perform a connection re-establishment procedure. Whether to continue the connection re-establishment procedure is determined according to a determining result of whether a suitable cell is the one of configured target cells.

The UE of the embodiment of the disclosure includes (but is not limited to) a receiver, a transmitter, and a processor. The processor is coupled to the receiver and the transmitter and configured to: in response to handover failure of a handover procedure from a source cell to one or more target configured target cells, perform a cell selection procedure to select a suitable cell is performed, where the cell selection procedure is configured to perform a connection re-establishment procedure. Whether to continue the connection re-establishment procedure is determined according to a determining result of whether a suitable cell is the one of configured target cells.

The communication system of the embodiment of the disclosure includes a source cell, one or more configured target cells, and user equipment. When a handover procedure of the UE from the source cell to one configured target cell fails, in response to the handover failure of the procedure, the UE performs a cell selection procedure to select a suitable cell, determines whether the suitable cell is the configured target cell, and determines to continue the connection re-establishment procedure according to a determining result of whether the suitable cell is the one of configured target cells. The cell selection procedure is configured to perform a connection re-establishment procedure.

In order to make the foregoing features and advantages of the disclosure more apparent and easier to understand, the following gives descriptions in detail by listing embodiments with reference to the accompanying drawings.

DETAILED DESCRIPTION OF DISCLOSED EMBODIMENTS

Figure 2:
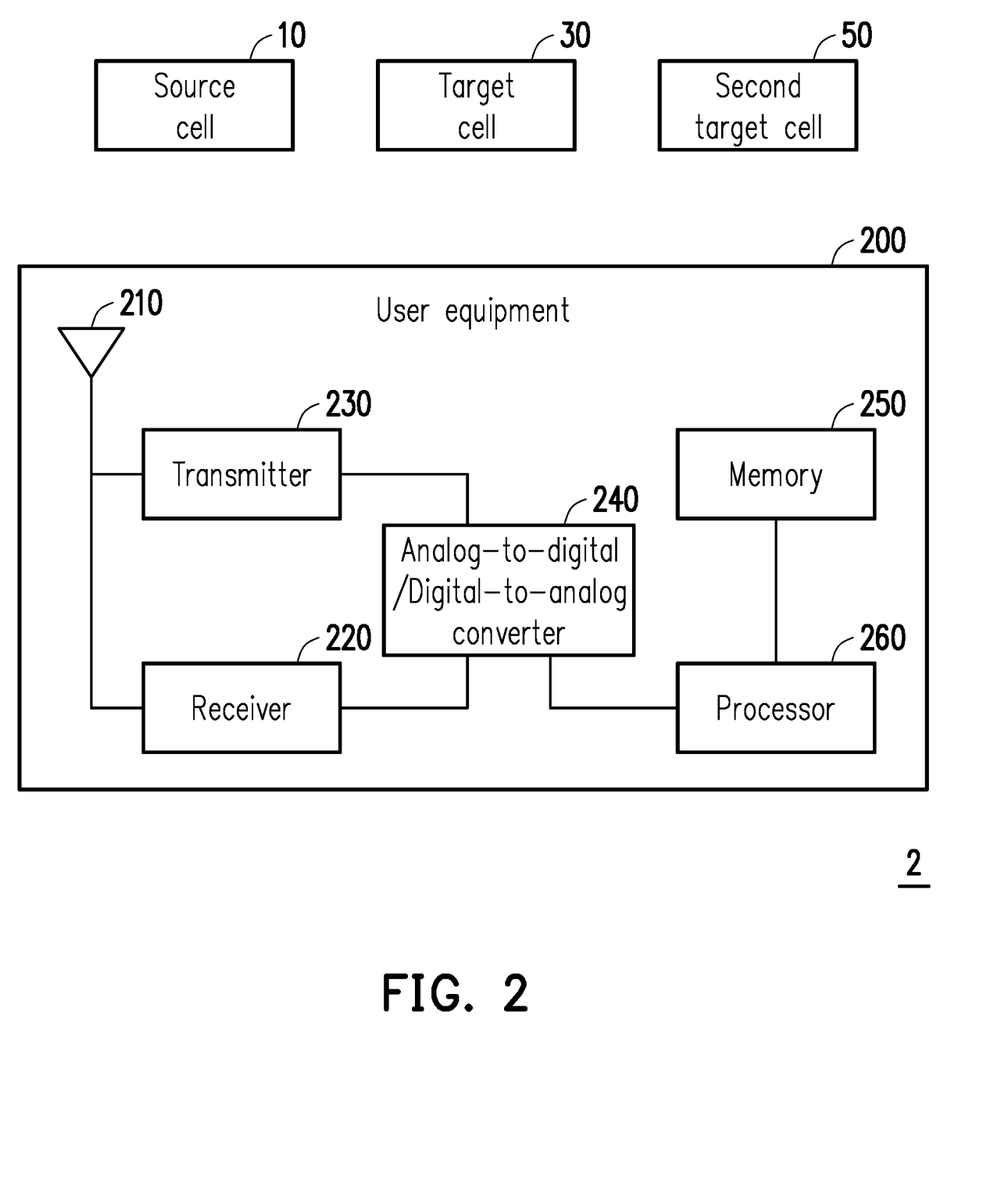
FIG. 2 is a block diagram of a communication system according to an embodiment of the disclosure.

FIG. 2 is a block diagram of a communication system 2 according to an embodiment of the disclosure. Referring to FIG. 2, the communication system 2 includes, but is not limited to, a source cell 10, one or more target cells 30, a second target cell 50, and user equipment (UE) 200.

The source cell 10, the target cell 30, and the second target cell 50 may have various implementations, for example (but not limited to) a home evolved Node B (HeNB), an eNB, a next generation Node B (gNB), an integrated access and backhaul (IAB) network node, an advanced base station (ABS), a Base Transceiver System (BTS), a relay, a repeater, a cell and/or a satellite-based communication base station.

The UE 200 may have various implementations, for example (but not limited to) a mobile station, an advanced mobile station (AMS), a telephone apparatus, customer premise equipment (CPE), a wireless sensor, and the like.

The UE 200 includes, but is not limited to, an antenna 210, a receiver 220, a transmitter 230, an analog-to-digital/digital-to-analog converter 240, a memory 250, and a processor 260. The antenna 210 is coupled to the receiver 220 and the transmitter 230. The analog-to-digital/digital-to-analog converter 240 is coupled to the receiver 220, the transmitter 230, and the processor 260. The processor 260 is further coupled to the memory 250.

The receiver 220 and the transmitter 230 are respectively configured to wirelessly receive a downlink signal and transmit an uplink signal through the antenna 210. The receiver 220 and the transmitter 230 may also perform analog signal processing operations such as low noise amplification, impedance matching, frequency mixing, up-conversion or down-conversion, filtering, amplification, and the like. The analog-to-digital/digital-to-analog converter 240 is configured to convert the downlink signal from an analog signal format to a digital signal format, and convert the uplink signal from the digital signal format to the analog signal format.

The memory 250 may be any type of fixed or removable random access memory (RAM), a read-only memory (ROM), a flash memory or a similar element, or a combination of the foregoing elements. The memory 250 records a program code, apparatus configuration, a codebook, buffered or permanent data, and records various communication protocol-related software modules such as a radio resource control (RRC) layer, a packet data convergence protocol (PDCP) layer, a radio link control (RLC) layer, a media access control (MAC) layer, and the like, and data thereof.

The processor 260 is configured to process a digital signal and execute a program according to an exemplary embodiment of the disclosure, and may access or load data and software modules recorded in the memory 250. A function of the processor 260 may be implemented by using programmable units such as a central processing unit (CPU), a microprocessor, a microcontroller, a digital signal processing (DSP) chip, a field programmable logic gate array (FPGA), and the like. The function of the processor 260 may also be implemented by using an independent electronic device or an integrated circuit (IC), and operations of the processor 260 may be implemented through software.

In the following, the method in the embodiment of the disclosure would be described in combination with apparatuses and elements thereof in the communication system 1. Each process of the method according to the embodiment of the disclosure may be adjusted according to an implementation situation, and is not limited thereto.

Figure 3:
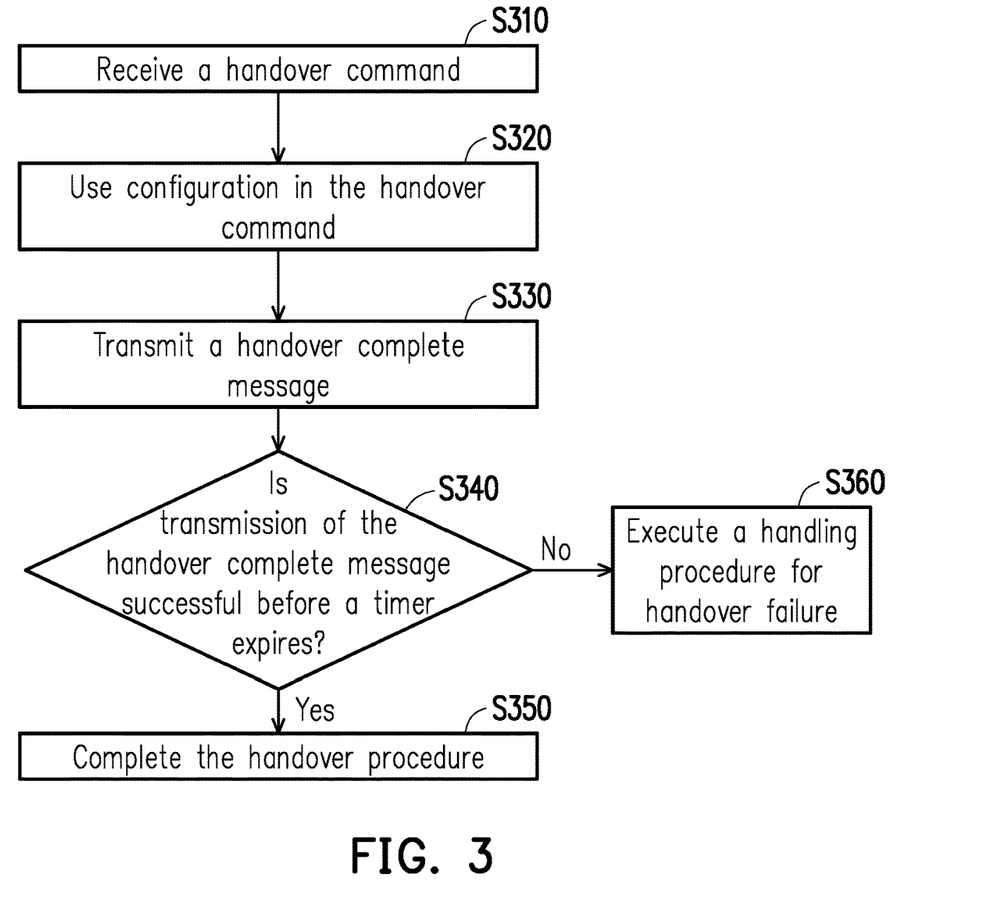
FIG. 3 is a flowchart of a handover procedure according to an embodiment of the disclosure.

FIG. 3 is a flowchart of a handover procedure according to an embodiment of the disclosure. Referring to FIG. 3, the processor 260 of user equipment (UE) 200 receives an RRC reconfiguration message accompanying a handover command through the receiver 220 (step S310), to trigger a handover procedure to be started. For ease of description, it is assumed below that the UE 200 receives service from a source cell 10 (that is, the source cell 10 is a currently serving cell or a current serving cell), and in response to conformity with a handover condition (for example, related to signal strength, the number of failures, or the like), it is expected that the source cell 10 is to be handed over (switch) to the target cell 30 (for example, received signal strength of the target cell 30 is greater than that of the source cell 10 and the second target cell 50) (the target cell 30 may be referred to as a target cell). In other words, the handover procedure triggered at this time is to hand over to the target cell 30 for access service. As the handover procedure is triggered, a timer (for example, T304 or other timers defined by 3GPP) would be started and used to detect whether a handover problem (handover failure) occurs.

The processor 260 may use the configuration in the handover command for setting. The configuration at this time is provided by the source cell 10 and is related to the setting of being to hand over to the target cell 30 (step S320), and is handed over to the target cell 30 accordingly. The processor 260 may transmit a reconfiguration complete message about an RRC connection to the target cell 30 through the transmitter 230 (step S330).

The processor 260 may determine whether the transmission of the reconfiguration complete message is successful before the foregoing timer expires (step S340). That is, it is confirmed whether the reconfiguration complete message is successfully delivered to the target cell 30. If the reconfiguration complete message is successfully delivered, the handover procedure to the target cell 30 is completed (step S350). However, if the message is not delivered successfully, the processor 260 needs to further execute the handover failure procedure, and determines that the handover procedure to the target cell 30 fails (step S360).

Figure 4:
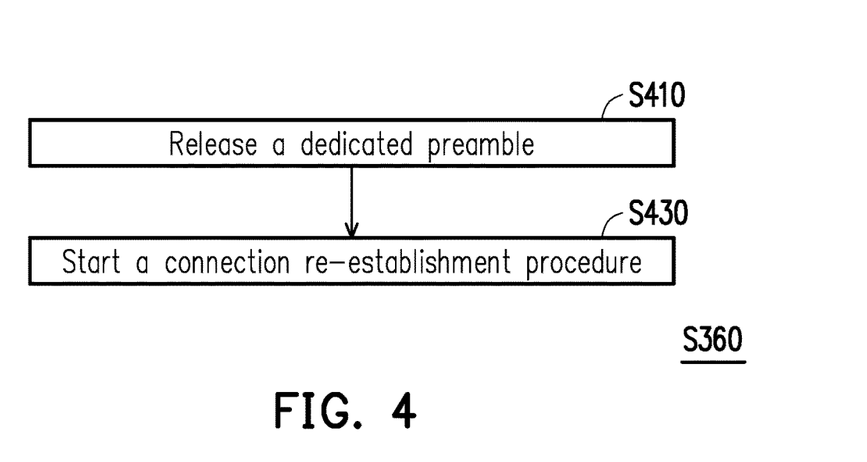
FIG. 4 is a flowchart of a handling procedure for handover failure according to an embodiment of the disclosure.

FIG. 4 is a flowchart of a handling procedure for handover failure according to an embodiment of the disclosure. Referring to FIG. 4, the processor 260 may release a dedicated preamble for the handover complete message (step S410). It should be noted that, different from the prior art, configuration information provided by a source cell 10 is returned, and the processor 260 of the embodiment of the disclosure would directly execute a connection re-establishment procedure for handover failure (step S430). That is, the UE 200 does not immediately return the configuration information provided by the source cell 10, and needs to further evaluate whether to return the configuration information. It should be noted that the configuration is related to state variables and parameters of one or more radio bearers (RB) used by the UE 200, and is used to cause the target cell 30 or the second target cell 50 to identify an identity of the UE 200 through the source cell 10, and is, for example, "the configuration" defined by 3GPP TS 38.331 on the handover failure caused by expiration of T304.

Figure 5:
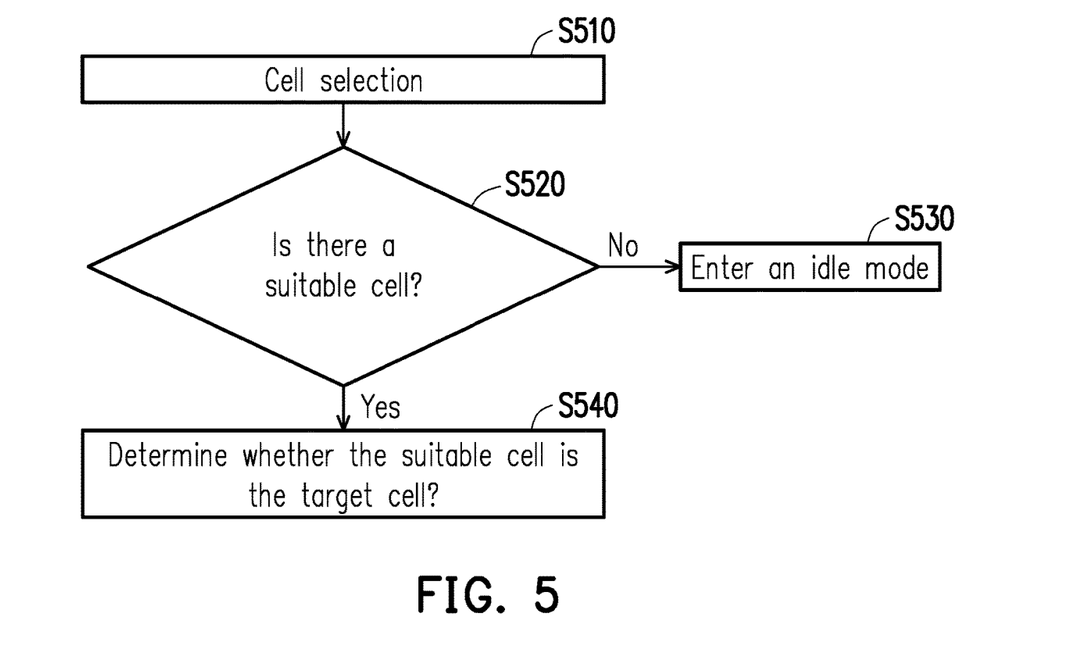
FIG. 5 is a flowchart of a cell selection procedure according to an embodiment of the disclosure.

FIG. 5 is a flowchart of a cell selection procedure according to an embodiment of the disclosure. Referring to FIG. 5, in a connection re-establishment procedure, the processor 260 is to perform cell selection (step S510) to select a suitable cell for the connection re-establishment procedure within a specific time period (for example, a cell that user equipment (UE) 200 may camp on to obtain normal service, or referred to as a "suitable cell"). The processor 260 may determine whether the cell selection already selects a suitable cell (step S520). If the time period expires but there is no suitable cell, the UE 200 enters an idle mode (step S530). If there is a suitable cell (referred to as a selected cell below), the processor 260 continues the connection re-establishment procedure (step S540).

Figure 6:
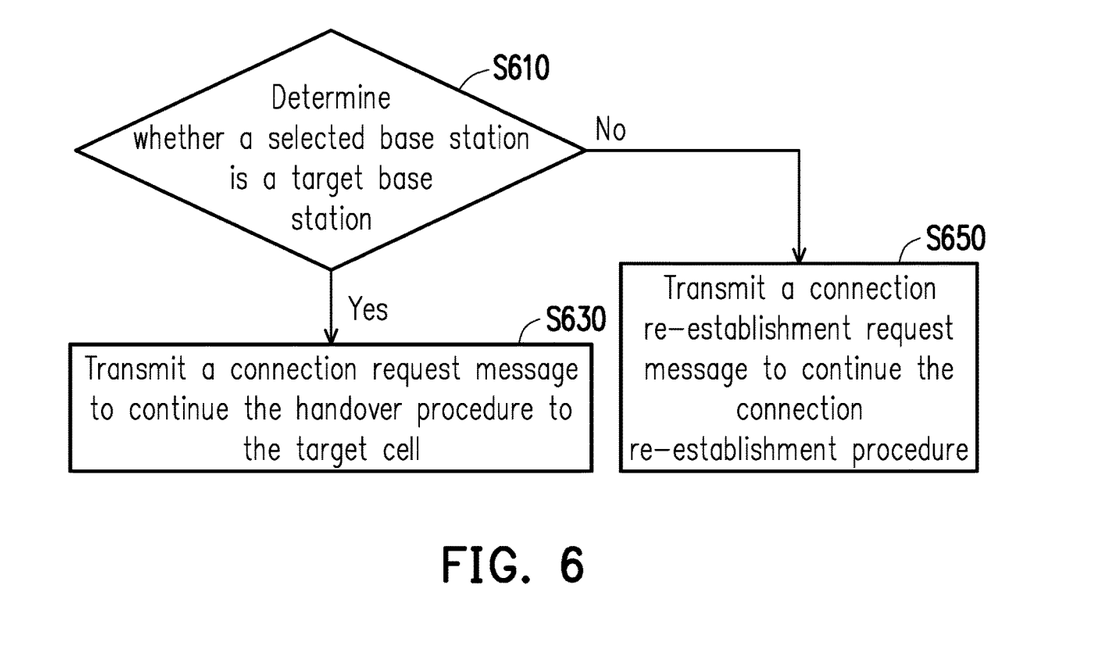
FIG. 6 is a flowchart of a handling method for handover failure according to an embodiment of the disclosure.

FIG. 6 is a flowchart of a handling method for handover failure according to an embodiment of the disclosure. Referring to FIG. 6, different from the prior art, a re-establishment request message about an RRC connection is directly transmitted to the selected cell based on the configuration provided by the source cell 10, and in the embodiment of the disclosure, it is determined whether the selected cell (that is, the selected suitable cell or the selected suitable cell) is a target cell 30 (that is, a target cell expected to be handed over in the foregoing handover procedure) in a connection re-establishment procedure (step S610). For example, it is confirmed whether identification information of the selected cell matches identification information of the target cell 30.

In some embodiments, in the handover procedure, the source cell 10 may configure more than one target cell 30 for the UE 200. The processor 260 may determine whether the selected cell is one of the configured target cells.

Then, the processor 260 determines, according to a determining result (that is, whether the selected cell is the target cell 30 or not) of the selected cell, to continue a handover procedure to the target cell 30. In addition, the determining result is also used to confirm whether to reuse the configuration provided by the source cell 10 to continue the connection re-establishment procedure for the selected cell.

If the determining result is that the selected cell is the target cell 30 (indicating that the user equipment 200 is still located within the service coverage of the target cell 30), the processor 260 may send a connection request message to the target cell 30 through the transmitter 230, to continue the handover procedure to the target cell 30 (step S630).

In an embodiment, the connection request message may associated first user identification information (for example, carried in a handover command received during the handover procedure or used the dedicated preamble configured for the handover procedure to identify user) of the user equipment 200 provided by the target cell 30 and cell identification information of the target cell 30. The first user identification information is, for example, a cell radio network temporary identifier (C-RNTI) or other identification information used to identify the UE 200. The cell identification information is, for example, physical cell identity (PCI) or other cell ID.

Different from that the related information of the source cell 10 is carried in the connection re-establishment message to identify the identity of the user equipment 200 through the source cell 10, in the embodiment of the disclosure, the related information of the target cell 30 may be directly provided, so that the target cell 30 may identify the identity of the user equipment 200 by itself/locally.

In some embodiments, in addition to the first user identification information and the cell identification information of the target cell, the connection request message may further include the second user identification information provided by the source cell 10 and the cell identification information of the source cell 10, so that the target cell 30 may request the source cell 10 (that is, externally) to identify the identity of the user equipment 200. For implementation of the second user identification information and the cell identification information of the source cell 10, reference may be made to the first user identification information and the cell identification information of the target cell 30, respectively, and the descriptions thereof are omitted herein.

In addition, if the selected cell is the target cell 30, the processor 260 may no longer use the configuration provided by the source cell 10, and does not need or cancel sending the connection re-establishment request message to continue the connection re-establishment procedure.

Figure 7:
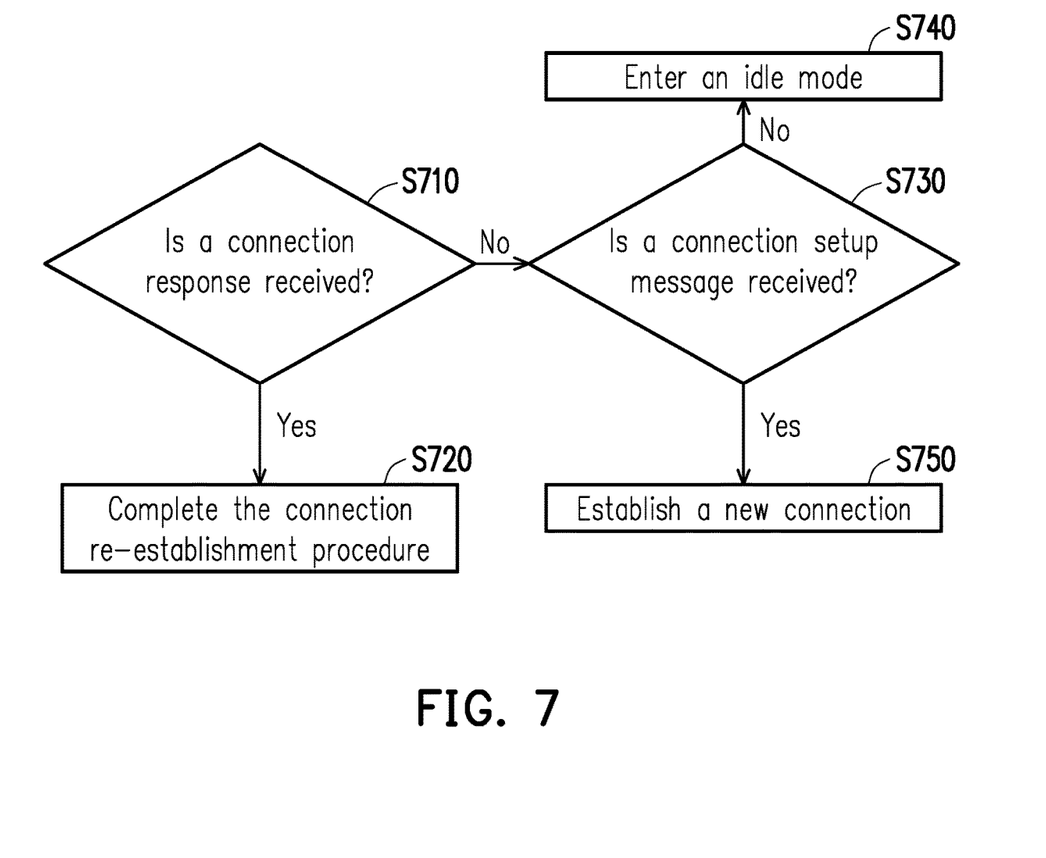
FIG. 7 is a flowchart of the continuation of handover procedure according to an embodiment of the disclosure.

FIG. 7 is a flowchart of the continuation of handover procedure according to an embodiment of the disclosure. Referring to FIG. 7, in response to the transmission of a connection request message, the processor 260 determines whether the receiver 220 receives a connection response (step S710). The connection response is used to respond to the foregoing connection request message, and is related to the handover procedure is successful, for example, a fact that the target cell 30 has obtained context data of user equipment 200 according to the connection request message. That is, the target cell 30 has confirmed the identity of the user equipment 200. The context data is necessary information used to maintain access service of the user equipment 200, for example, identification information of status, security, capabilities and/or connection.

If the connection response has been received, the processor 260 may transmit a connection complete message to the target cell 30 through the transmitter 230 (step S720). The connection complete message could be used to instruct the completion of the connection re-establishment procedure or the handover procedure to the target cell 30.

In addition, if the connection response is not received, the processor 260 further determines whether the receiver 220 has received a connection setup message related to an RRC connection (step S730). The connection setup message is related to a fact that the target cell 30 fails to obtain the context data of the user equipment 200 or has not identified the identity of the user equipment 200. If the connection setup message is not received, the processor 260 enters an idle mode (step S740). That is, the UE 200 cancels handover to the target cell 30. In addition, if the connection setup message is received, the processor 260 would establish a new connection (for example, a new RRC connection or a new signalling radio bearer (SRB)) for the target cell 30 according to the connection setup message (step S750).

Several embodiments are described below to describe how to continue the handover procedure to the target cell 30. In addition, it is assumed that the user equipment 20 has confirmed that the selected cell conforms to the condition of a suitable target cell and the selected cell is the target cell 30, and it is determined that the consecutive handover procedure conditions are satisfied.

Figure 8:
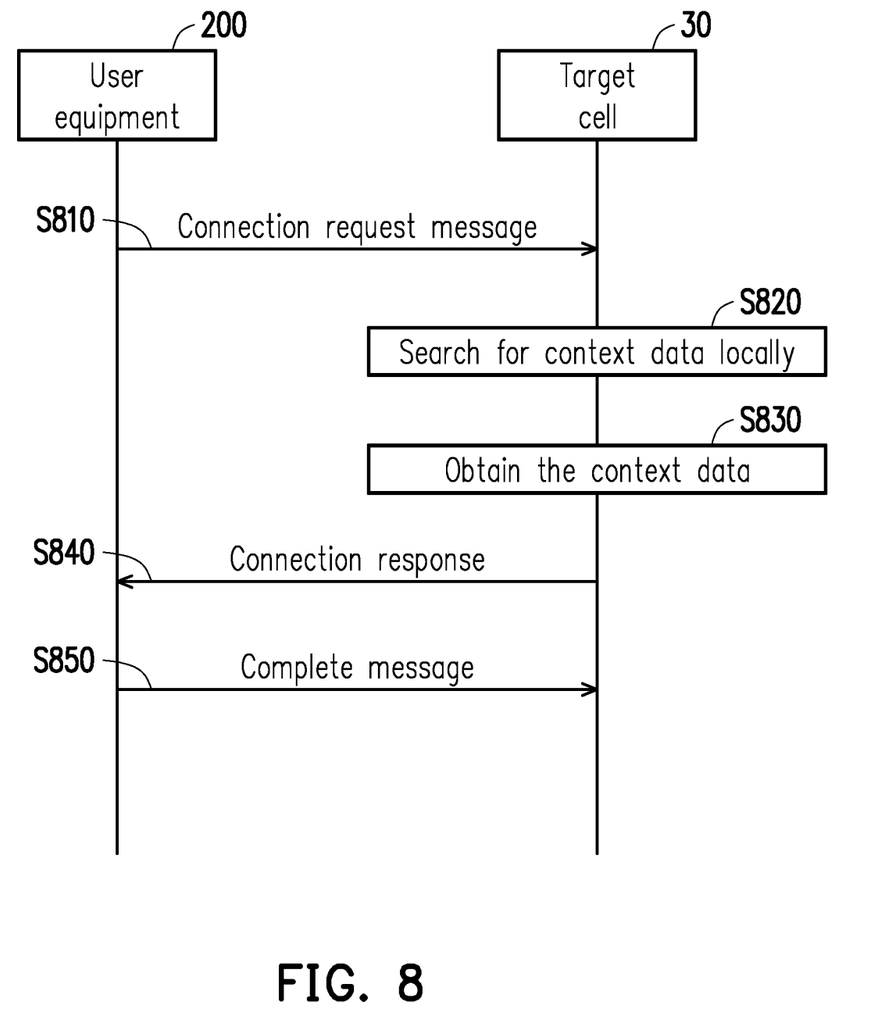
FIG. 8 is a flowchart of the continuation of handover procedure according to an embodiment of the disclosure.

FIG. 8 is a flowchart of the continuation of handover procedure according to an embodiment of the disclosure. Referring to FIG. 8, if user equipment 200 is determine to continue the handover procedure, a connection request message is transmitted to a target cell 30 (step S810). In this embodiment, the connection request message includes cell identification information of the target cell 30 and first user identification information of the user equipment 200 provided by the target cell 30. The target cell 30 identifies and verifies an identity of the user equipment 200 based on the cell identification information and the first user identification information, and searches corresponding context data locally (step S820). Local searching herein means that the identity is not identified through the source cell 10, or it is confirmed whether the target cell 30 still retains the context data. If the context data is obtained (step S830), the target cell 30 transmits a connection response to the user equipment 200 (step S840). The user equipment 200 may transmit a connection complete message to the target cell 30 based on the reception of the connection response (step S850).

Figure 9:
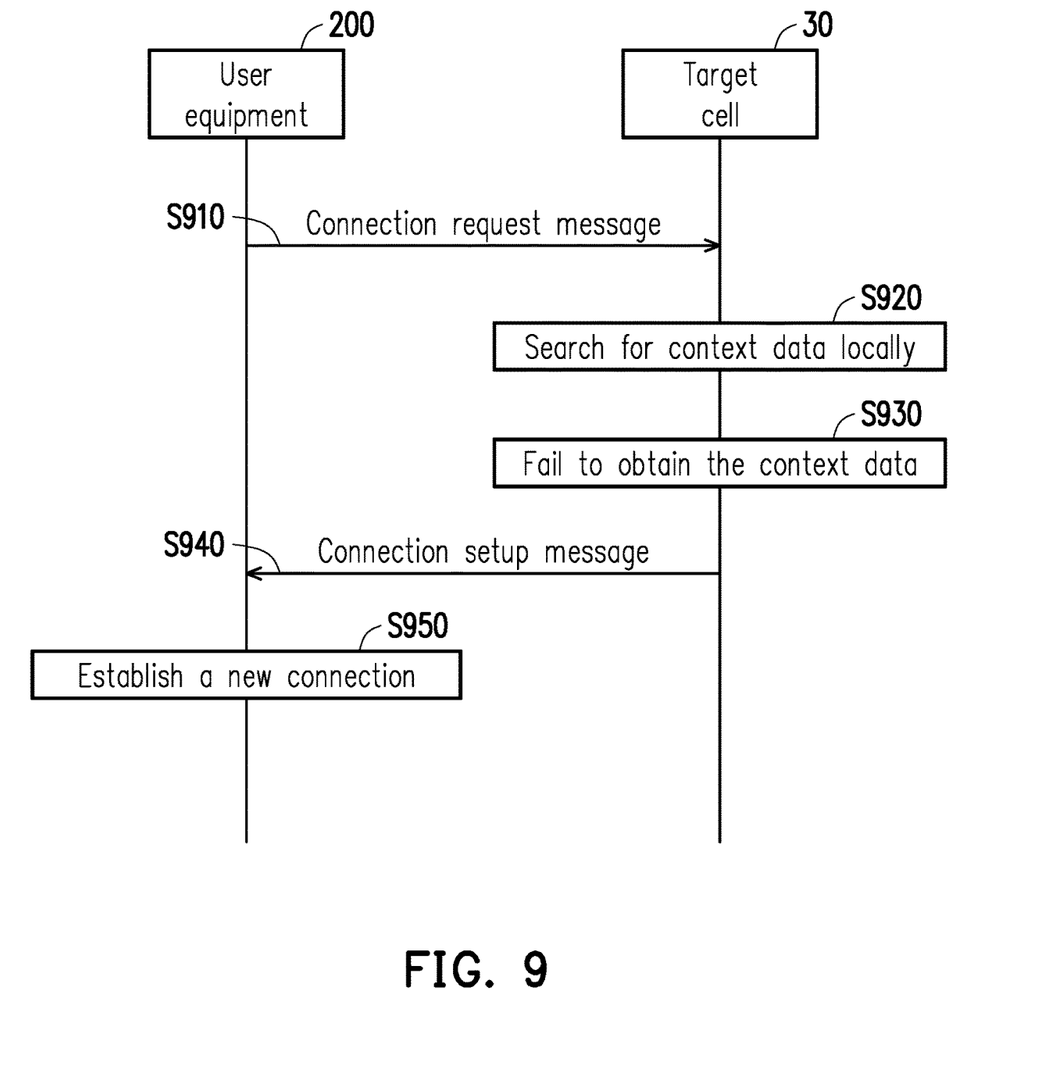
FIG. 9 is a flowchart of the continuation of handover procedure according to an embodiment of the disclosure.

FIG. 9 is a flowchart of the continuation of handover procedure according to an embodiment of the disclosure. Referring to FIG. 9, for step S910 and step S920, reference may be made to the descriptions of step S810 and step S820 in FIG. 8, and the descriptions thereof are omitted herein. A difference from the embodiment of FIG. 8 is that the target cell 30 fails to obtain or retain context data of the user equipment 20 (step S930). In addition, the target cell 30 transmits a connection setup message to the user equipment 200 (step S940), so that the user equipment 200 may establish a new connection accordingly (step S950).

Figure 10:
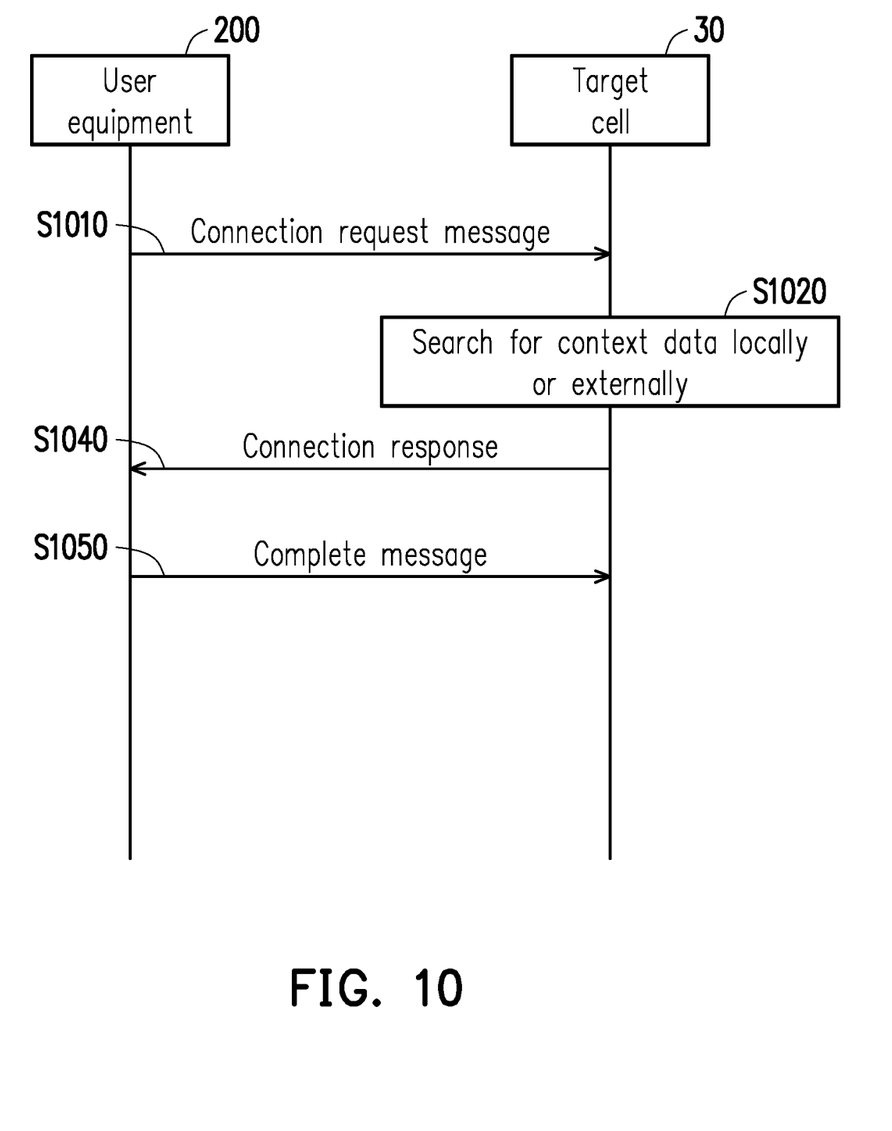
FIG. 10 is a flowchart of the continuation of handover procedure according to an embodiment of the disclosure.

FIG. 10 is a flowchart of the continuation of handover procedure according to an embodiment of the disclosure. Referring to FIG. 10, a difference from the embodiments of FIG. 8 and FIG. 9 is that a connection request message further includes cell identification information of the source cell 10 and second user identification information of the user equipment 200 provided by the source cell (step S1010). In this case, even if the target cell 30 does not retain context data of the user equipment 200, the target cell may still identify an identity (that is, search for the context data locally or externally) of the user equipment 200 through the source cell 10 based on the cell identification information and the second user identification information of the source cell 10, and obtain the context data accordingly (step S1020). For step S1040 and step S1050, reference may be made to the descriptions of step S840 and step S850 of FIG. 8, respectively, and the descriptions thereof are omitted herein. In some embodiments, the connection response transmitted in step S1040 may instruct the user equipment 200 to return configuration provided by the source cell 10.

Figure 11:
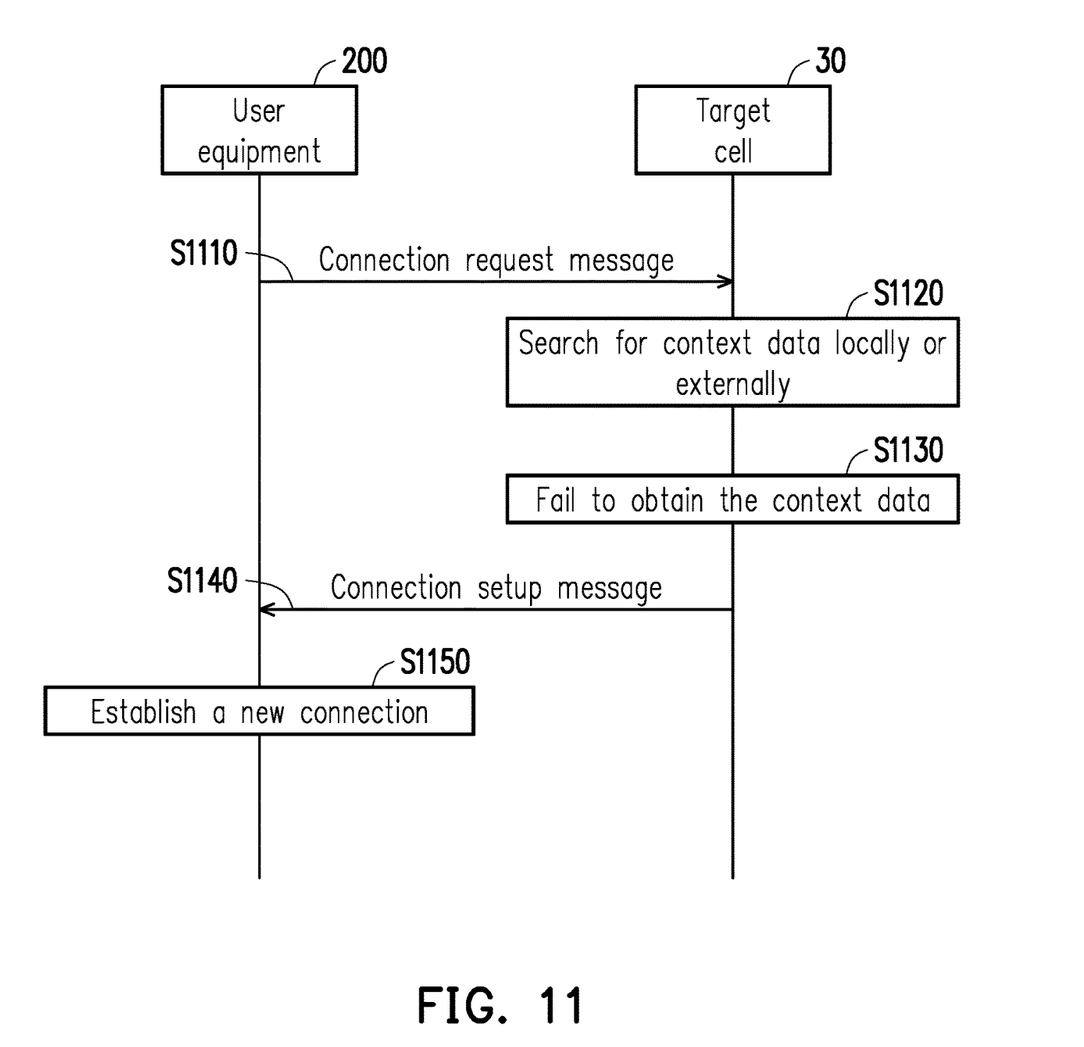
FIG. 11 is a flowchart of the continuation of handover procedure according to an embodiment of the disclosure.

FIG. 11 is a flowchart of the continuation of handover procedure according to an embodiment of the disclosure. Referring to FIG. 11, for step S1110 and step S1120, reference may be made to the descriptions of step S1010 and step S1020 in FIG. 10, and the descriptions thereof are omitted herein. A difference from the embodiment of FIG. 10 is that neither the source cell 10 nor the target cell 30 retains the context data, so that the target cell 30 cannot obtain the context data (step S1130). Next, for step S1140 and step S1150 of FIG. 11, reference may be made to the descriptions of step S940 and step S950 of FIG. 9, respectively, and the descriptions thereof are omitted herein.

Figure 12:
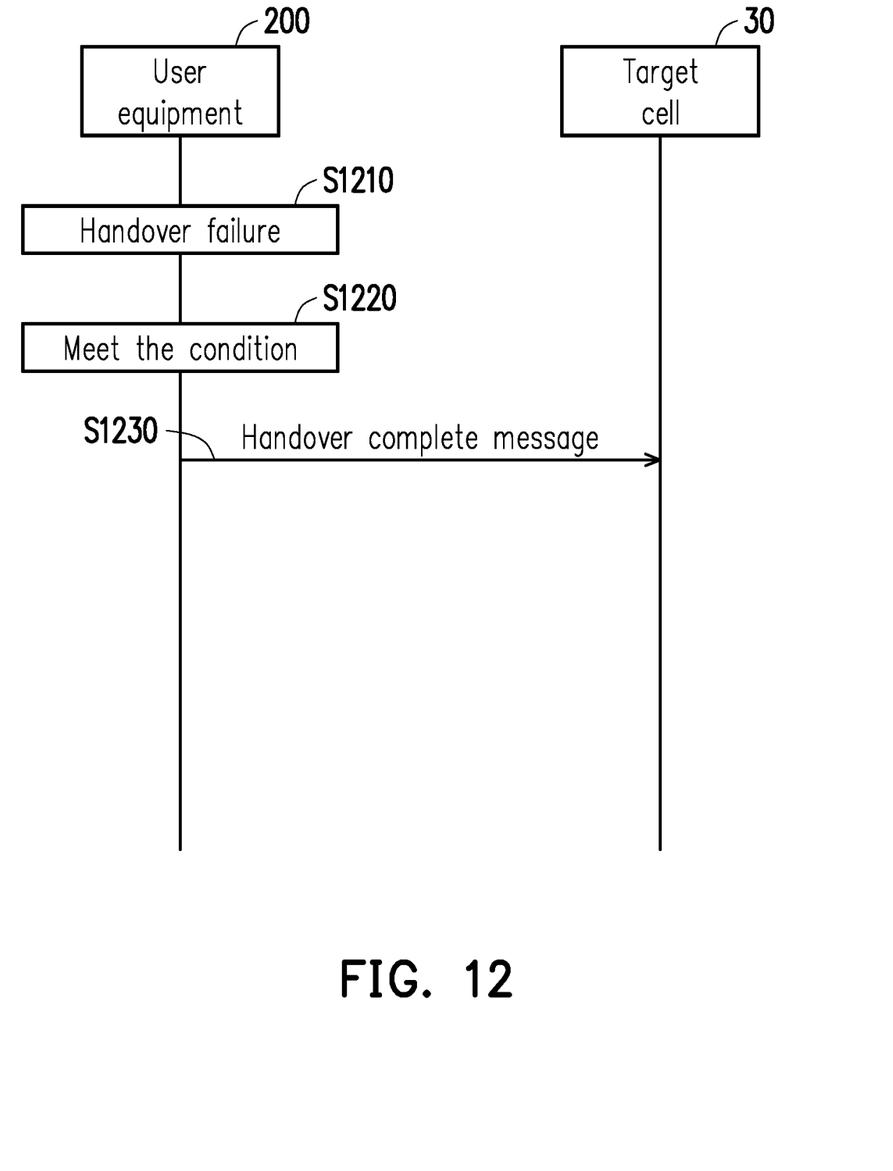
FIG. 12 is a flowchart of a conditional handover procedure according to an embodiment of the disclosure.

FIG. 12 is a flowchart of a conditional handover (CHO) procedure according to an embodiment of the disclosure. Referring to FIG. 12, it is assumed that user equipment 20 is set with conditional handover configuration (CHO configuration). The user equipment 20 declares that the handover fails (step S1210), and further determines whether a condition of the conditional handover for a connection re-establishment procedure is met (step S1220). The condition may include that a selected cell (that is, a target cell 30) meets the condition of a suitable target cell and is a candidate of a target cell set with conditional handover configuration. If the condition is met, the user equipment 20 may further transmit a handover complete message to indicate completion of the handover procedure to the target cell 30 (step S1230).

The foregoing embodiment relates to the situation that the selected cell is the target cell 30. Returning to FIG. 6, if the determining result is that the selected cell is not the target cell 30 (assuming that the selected cell is a second target cell 50 of FIG. 2), the processor 260 transmits a connection re-establishment request message to the second target cell 50 through the transmitter 230 according to the configuration provided by the source cell 10, to continue the connection re-establishment procedure of the selected cell (step S650). In comparison to the prior art, the configuration provided by the source cell 10 is returned before the cell selection procedure, and in the embodiment of the disclosure, it is determined, based on the determining result (that is, a time point is after the cell selection procedure) of the selected cell, whether to return the configuration. A connection re-establishment request message would provide information about the user equipment 200 (for example, cell identification information of the source cell 10 and second user identification information provided by the source cell), so that the second target cell 50 may identify the identity of the user equipment 200 through the source cell 10 and obtain the context data of the user equipment accordingly.

Figure 13:
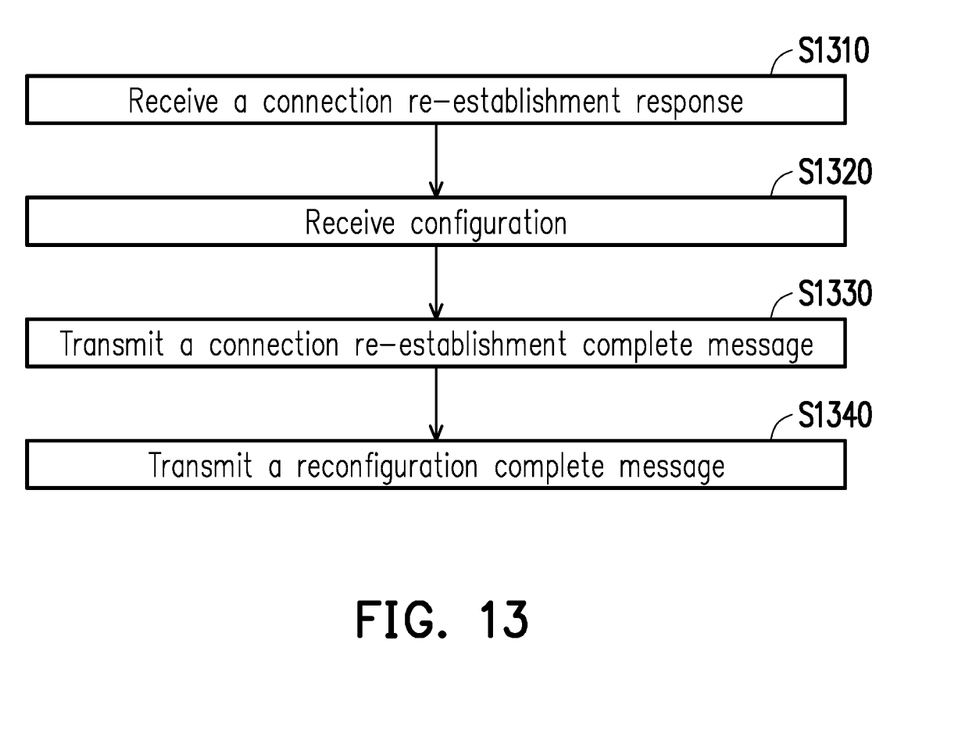
FIG. 13 is a flowchart of the continuation of connection re-establishment procedure according to an embodiment of the disclosure.

FIG. 13 is a flowchart of the continuation of connection re-establishment procedure according to an embodiment of the disclosure. Referring to FIG. 13, the processor 260 receives a connection re-establishment response through the receiver 220 (step S1310). The connection re-establishment response is in response to the connection re-establishment request message, and is related to a fact that the second target cell 50 has successfully obtained context data. In some embodiments, if the connection re-establishment procedure may continue, the second target cell 50 may execute a reconfiguration procedure related to RRC connection, so that the receiver 220 may receive a corresponding reconfiguration message (step S1320).

Then, in response to receiving the connection re-establishment response, the processor 260 may transmit a complete message through the transmitter 230 (step 1330). In addition, in response to receiving the reconfiguration message, the processor 260 may transmit a connection reconfiguration complete message through the transmitter 230 (step 1340). In this way, the connection re-establishment procedure and the reconfiguration procedure may be completed, which means that the user equipment 200 has successfully re-established a connection with the second target cell 50.

Based on the above, in the user equipment, the communication system, and the handling method for handover failure of the embodiments of the disclosure, it is determined whether the selected cell obtained through the cell selection procedure is the target cell in the original handover procedure (for example, whether the user equipment is still within the service coverage of the target cell), and it is determined, based on the determining result, whether to continue the handover procedure to the target cell. In comparison to the prior art, if the selected cell is still the original target cell, the connection re-establishment procedure may be simplified, thereby reducing signalling waste and further avoiding procedure delay.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure should be subject to the appended claims.

What is claimed is:

1. A handling method for handover failure, the handling method comprises:
   in response to a handover procedure failing, performing a cell selection procedure to select a suitable cell, wherein the handover procedure of a user equipment (UE) from a source cell to at least one configured target cell fails, wherein the cell selection procedure is triggered by a connection re-establishment procedure;
   determining, through the UE, whether the suitable cell is the configured target cell in the failed handover procedure to obtain a determining result; and
   determining, through the UE, whether to transmit a connection re-establishment message according to the determining result,
   wherein the step of the connection re-establishment procedure comprises:
      in response to the determining result being that the suitable cell is the at least one configured target cell, transmitting a connection request message to the suitable cell to continue the handover procedure.

2. The handling method for handover failure according to claim 1, wherein the step of the connection re-establishment procedure further comprises:
   in response to the determining result being that the suitable cell is not the at least one configured target cell, transmitting a connection re-establishment request message to the suitable cell and reverting back to source cell configuration.

3. The handling method for handover failure according to claim 2, wherein the connection request message associates first user identification information and cell identification information of the at least one configured target cell, the first user identification information is provided by the at least one configured target cell.

4. The handling method for handover failure according to claim 3, wherein the connection request message further comprises second user identification information and cell identification information of the source cell, and the second user identification information is provided by the source cell.

5. The handling method for handover failure according to claim 2, wherein after the step of transmitting the connection request message, the handling method further comprises:
   receiving a connection response, wherein the connection response is related to a fact that the handover procedure is successful; and
   in response to receiving the connection response, transmitting a complete message, wherein the complete message is used to indicate completion of the handover procedure.

6. The handling method for handover failure according to claim 4, wherein after the step of transmitting a connection request message, the handling method further comprises:
   receiving a connection setup message, wherein the connection setup message is used to establish a new connection.

7. The handling method for handover failure according to claim 1, further comprising:
   determining the handover procedure is a conditional handover (CHO);
   in response to the CHO failure, performing the cell selection procedure to select the suitable cell;
   determining whether to continue the connection re-establishment, according to whether the suitable cell is the at least one configured target cell, wherein the at least one configured target cell is configured by the CHO;
   in response to a determination that the suitable cell is the at least one configured target cell, transmitting a handover complete message to the suitable cell to continue the handover procedure.

8. The handling method for handover failure according to claim 1, wherein before the step of determining whether the suitable cell is the at least one configured target cell, the handling method further comprises:
   cancelling transmission of a handover complete message, wherein the handover complete message is used to indicate the completion of the handover procedure; and
   executing the connection re-establishment procedure and suspending source cell configuration.

9. A User equipment (UE), comprising:
   a receiver;
   a transmitter; and
   a processor, coupled to the receiver and the transmitter, and configured to:
   in response to a handover procedure of the UE from a source cell to at least one configured target cell failing, perform a cell selection procedure to select a suitable cell, wherein the cell selection procedure is triggered by a connection re-establishment procedure;
   determine whether the suitable cell is the configured target cell in the failed handover procedure to obtain a determining result;
   determine whether to transmit a connection re-establishment message according to the determining result; and
   in response to the determining result being that the suitable cell is the at least one configured target cell, transmit a connection request message to the suitable cell through the transmitter, to continue the handover procedure.

10. The UE according to claim 9, wherein the processor is further configured to:
   in response to the determining result being that the suitable cell is not the at least one configured target cell, transmit a connection re-establishment request message to the suitable cell through the transmitter and reverting back to source cell configuration.

11. The UE according to claim 10, wherein the processor is configured to:
   receive a connection response through the receiver, wherein the connection response is related to a fact that the handover procedure is successful; and
   in response to receiving the connection response, transmit a complete message through the transmitter, wherein the complete message is used to indicate completion of the handover procedure.

12. The UE according to claim 10, wherein the processor is configured to:

receive a connection setup message through the receiver, wherein the connection setup message is used to establish a new connection.

13. The UE according to claim 9, wherein the processor is further configured to:
    determine the handover procedure is a conditional handover (CHO);
    in response to the CHO failure, performing the cell selection procedure to select the suitable cell;
    determining whether to continue the connection re-establishment, according to whether the suitable cell is the at least one configured target cell, wherein the at least one configured target cell is configured by the CHO;
    in response to a determination that the suitable cell is the at least one configured target cell, transmit a handover complete message, through the transmitter, to the suitable cell to continue the handover procedure.

14. The UE according to claim 9, wherein the processor is configured to:
    cancel transmission of a handover complete message, wherein the handover complete message is used to indicate completion of the handover procedure; and
    execute the connection re-establishment procedure and suspend source cell configuration.

15. A communication system, comprising:
    a source cell;
    at least one configured target cell; and
    a user equipment (UE), wherein when a handover procedure of the UE from the source cell to the at least one configured target cell fails,
    in response to the handover procedure failing, the UE performs a cell selection procedure to select a suitable cell, wherein the cell selection procedure is triggered by a connection re-establishment procedure;
    determines whether the suitable cell is the configured target cell in the failed handover procedure to obtain a determining result; and
    determines to transmit a connection re-establishment message according to the determining result,
    wherein in response to the determining result being that the suitable cell is the at least one configured target cell, the UE transmits a connection request message to the suitable cell to continue the handover procedure.

16. The communication system according to claim 15, wherein in response to the determining result being that the suitable cell is not the at least one configured target cell, the UE transmits a connection re-establishment request message to the suitable cell and reverting back to source cell configuration.

17. The communication system according to claim 15, wherein the connection request message associates first user identification information and cell identification information of the at least one configured target cell, the first user identification information is provided by the at least one configured target cell.

18. The communication system according to claim 17, wherein the connection request message further comprises second user identification information and cell identification information of the source cell, and the second user identification information is provided by the source cell.

* * * * *